May 10, 1932.  W. HÖPP  1,857,193
MERCURY ARC RECTIFIER SUPPORT
Filed Nov. 21, 1928
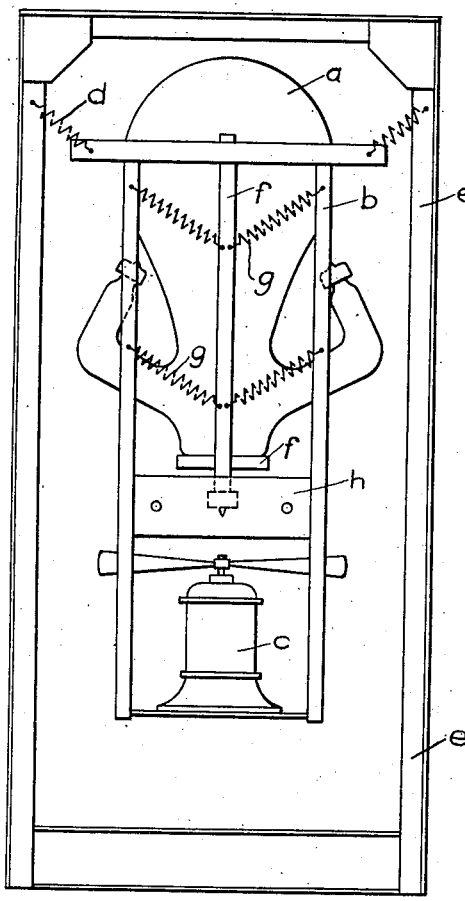
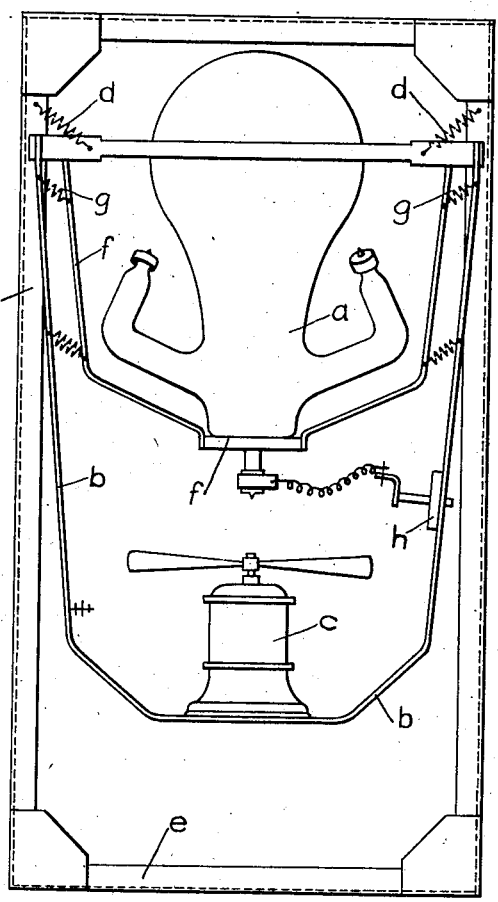
Inventor:
Wilhelm Höpp,
by Charles E. Tullar
His Attorney Patented May 10, 1932

1,857,193

UNITED STATES PATENT OFFICE

WILHELM HÖPP, OF HEILIGENSEE, A E G SIEDLUNG, GERMANY, ASSIGNOR TO GENERAL ELECTRIC COMPANY, A CORPORATION OF NEW YORK

MERCURY ARC RECTIFIER SUPPORT

Application filed November 21, 1928, Serial No. 320,959, and in Germany March 23, 1928.

My invention relates to supports for electric discharge devices such as mercury arc rectifiers for example, and has for its principal object the provision of an improved support which will absorb substantially all vibrations which would otherwise be imparted to the device.

Mercury arc rectifiers are often exposed to considerable vibration, when mounted on locomotives or other vehicles. These vibrations may cause unstable operation of the rectifiers and, in the case of glass rectifiers, may injure the walls thereof by causing the mercury to strike against them. In accordance with my invention this difficulty is overcome by the provision of an improved support which includes a series of frames or cradles resiliently mounted within each other, at least one of which is provided with weights for increasing its inertia and reducing its period of oscillation.

My invention will be better understood from the following description when considered in connection with the accompanying drawings and its scope will be pointed out in the appended claims.

Referring to the drawings, Figs. 1 and 2 illustrate a side and front elevation respectively of a supporting frame built in accordance with my invention. A frame $e$ is arranged to support resiliently a cradle $b$ by means of springs $d$. The springs $d$ support the cradle $b$ at the top so that it is free to oscillate to a limited extent within the frame $e$. In order to add inertia to this cradle and to lower its period of oscillation, a weight $c$ is mounted at its bottom. This may be any suitable weight but is preferably the driving motor of the cooling fan if such is used.

Within the cradle a holder $f$ supports the rectifier $a$. This holder $f$ is resiliently attached to the cradle $b$ by means of springs $g$. The springs $g$ permit a movement of the holder $f$ with respect to cradle $b$ but do not permit any appreciable oscillation thereof. By this arrangement any sudden shocks or jerks are taken up by the springs $d$ and $g$ and displacements caused by quick accelerations and decelerations of the locomotive are compensated for by the oscillation of the cradle $b$. It will be apparent that the oscillations may be damped by any other suitable means such as dash pots, or the like.

An efficient cooling of the rectifier and the fuses $h$, which are also mounted on cradle $b$, is obtained by mounting the fan on the cradle $b$, to serve as the period reducing weight. In this arrangement the fan is always in its predetermined position in respect to the rectifier $a$ and the cooling blast therefrom can be concentrated upon the hottest part thereof.

What I claim as new and desire to secure by Letters Patent of the United States is:

1. A support for electric discharge devices including a frame, a cradle within said frame resiliently attached thereto to depend from the upper end thereof and capable of oscillating, and a holder within said cradle adjacent the upper portion thereof resiliently attached to said cradle to depend from said upper portion for supporting the discharge device.

2. A support for electric discharge devices including a frame, a cradle within said frame resiliently attached thereto to depend from the upper end thereof and capable of oscillating, a holder within said cradle adjacent the upper portion thereof resiliently attached to said cradle to depend from said upper portion for supporting the discharge device, and a weight supported by said cradle at the end thereof remote from said holder for reducing the period of oscillation thereof.

3. A support for mercury arc rectifiers including a frame, a cradle within said frame resiliently attached thereto to depend from the upper end thereof and capable of oscillating, a holder within said cradle adjacent the upper portion thereof resiliently attached to said cradle to depend from said upper portion for supporting the rectifier, and a weight mounted on said cradle at the end thereof remote from said holder for increasing the inertia of said cradle.

4. An electric discharge device mounting including a frame, a cradle within said frame resiliently attached to and suspended from points on said frame adjacent the upper end thereof, a U-shaped device holder within said cradle and adjacent the upper portion thereof for supporting the discharge device, resilient means to attach said holder to said cradle at points on said cradle adjacent the upper end thereof and at points on said cradle between said first named points and the lower end of said cradle, and a weight mounted on said cradle at the end thereof remote from said holder to increase the inertia of said cradle.

In witness whereof, I have hereunto set my hand this 5th day of November, 1928.

WILHELM HÖPP.